US009578797B2

(12) United States Patent
Deppermann et al.

(10) Patent No.: US 9,578,797 B2
(45) Date of Patent: Feb. 28, 2017

(54) AUTOMATED SYSTEM FOR GERMINATION TESTING USING OPTICAL IMAGING

(75) Inventors: Kevin L. Deppermann, St. Charles, MO (US); Brad D. White, Creve Coeur, MO (US); Nathalie Vignaux, St. Louis, MO (US); Phillip Guy, Westlake Village, CA (US)

(73) Assignee: Monsanto Technology LLC, St. Louis, MO (US)

( * ) Notice: Subject to any disclaimer, the term of this patent is extended or adjusted under 35 U.S.C. 154(b) by 948 days.

(21) Appl. No.: 13/637,275

(22) PCT Filed: Mar. 17, 2011

(86) PCT No.: PCT/US2011/028799
  § 371 (c)(1),
  (2), (4) Date: May 23, 2013

(87) PCT Pub. No.: WO2011/119403
  PCT Pub. Date: Sep. 29, 2011

(65) Prior Publication Data
  US 2013/0235188 A1   Sep. 12, 2013

Related U.S. Application Data

(60) Provisional application No. 61/317,916, filed on Mar. 26, 2010.

(51) Int. Cl.
  *A01C 1/02*  (2006.01)
  *A01G 7/00*  (2006.01)
(52) U.S. Cl.
  CPC .............. *A01C 1/025* (2013.01); *A01G 7/00* (2013.01)

(58) Field of Classification Search
  CPC .. A01C 1/02; A01C 1/025; A01C 1/04; A01C 1/06
  See application file for complete search history.

(56) References Cited

U.S. PATENT DOCUMENTS 5,864,984 A    2/1999  McNertney
6,032,409 A *  3/2000  Obonai ................ A01G 9/1026
                                                      47/1.01 R (Continued)

OTHER PUBLICATIONS

PCT International Search Report and Written Opinion of the International Searching Authority mailed on May 26, 2011 regarding PCT/US2011/028799 filed on Mar. 17, 2011, 12 pgs.

(Continued)

*Primary Examiner* — Christopher Findley
(74) *Attorney, Agent, or Firm* — James E. Davis

(57) ABSTRACT

A system prepares plant specimens, tracks the plant specimens, captures images of the plant specimens, and evaluates growth parameters of the plant specimens in the captured images. The system prepares receptacles by placing a predetermined quantity of gel, if required by a particular test, into a receptacle and a layer of material, if required by a particular test, on top of the gel. The system separates a quantity of seeds into individual seeds and places an individual seed in each receptacle between the gel layer and the cover layer. The receptacles are then arrayed into decks and carts and subjected to controlled stress conditions and conditions conducive to germination and growth. An image capture device captures backlit images of the receptacles, and a processor analyzes the captured images for growth parameters of the plant specimens and enters those parameters into a database together with a unique identifier of the plant specimen.

10 Claims, 5 Drawing Sheets

(56) References Cited

U.S. PATENT DOCUMENTS

| | | | |
|---|---|---|---|
| 2004/0263957 A1 | 12/2004 | Hirahara et al. | |
| 2006/0123701 A1* | 6/2006 | Lilly | A01C 1/04 47/57.6 |
| 2007/0190521 A1* | 8/2007 | MacIsaac | A01G 9/085 435/4 |
| 2008/0000815 A1 | 1/2008 | Deppermann | |
| 2009/0130685 A1 | 5/2009 | Taramino et al. | |
| 2011/0116688 A1* | 5/2011 | Li | G01N 33/0098 382/110 |
| 2011/0167721 A1* | 7/2011 | Lejeune | A01H 1/04 47/65 |

OTHER PUBLICATIONS

Dell'Aquila, Antonio, New Perspectives for Seed Germination Testing Through Digital Imaging Technology, The Open Agriculture Journal, 2009, pp. 37-42, vol. 3.

* cited by examiner

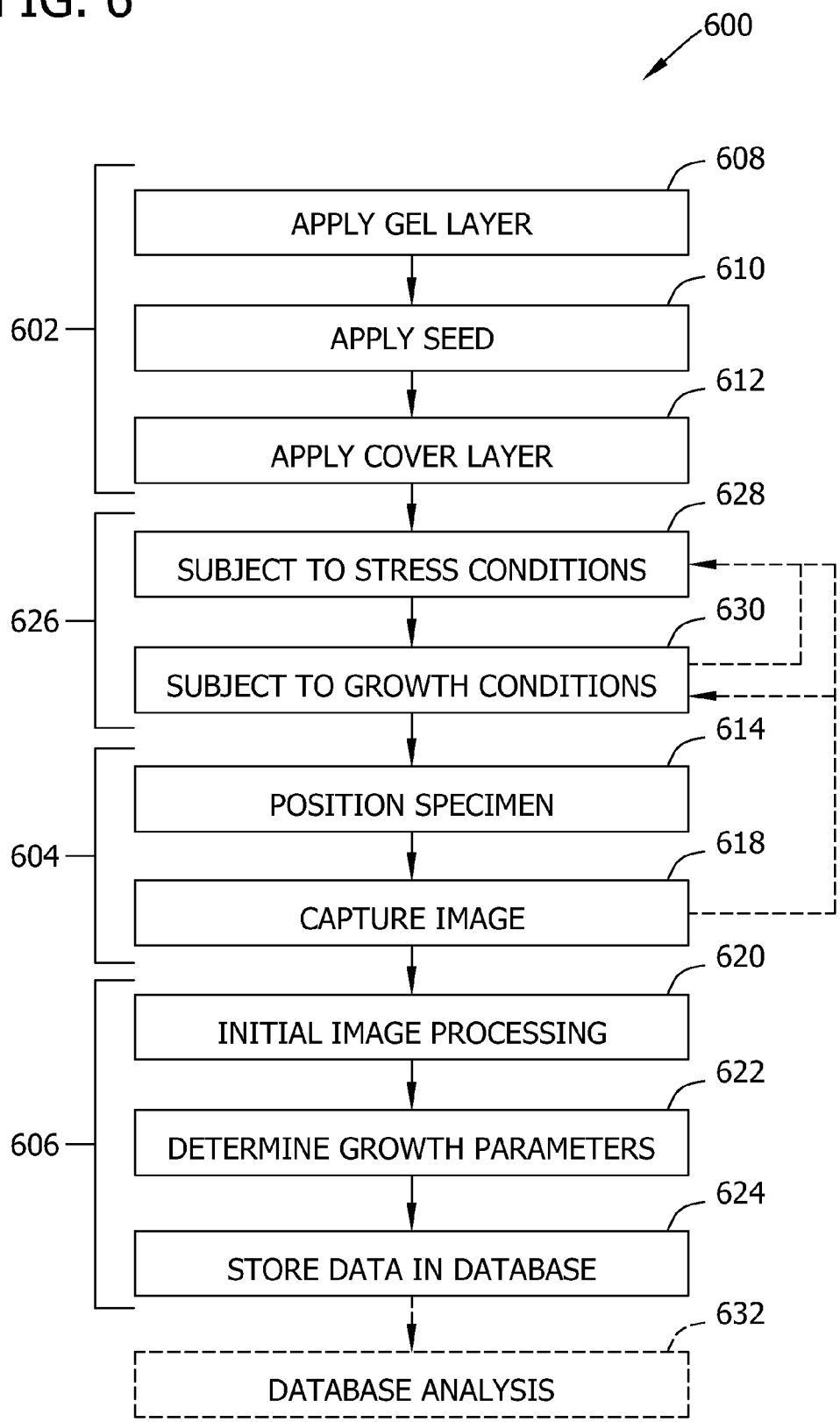

AUTOMATED SYSTEM FOR GERMINATION TESTING USING OPTICAL IMAGING

CROSS-REFERENCE TO RELATED APPLICATIONS

This application is a U.S. National Stage filing under 35 U.S.C. §371 of International Application No. PCT/US2011/28799 filed 17 Mar. 2011, which published as WO2011/119403 and which claims priority to U.S. patent application Ser. No. 61/317,916, filed on 26 Mar. 2010, which are incorporated herein by reference.

FIELD OF THE DISCLOSURE

The field of this disclosure relates to systems and methods for measuring growth parameters of plant specimens, and more particularly, to automatically producing plant specimens, capturing images of the plant specimens, and analyzing the captured images to gather data relating to growth parameters of the plant specimens.

BACKGROUND

Advances in crop science and biotechnology have led to specialty crops that have one or more desirable traits. Examples of such traits include: germination potential, drought-resistance, pesticide tolerance (e.g., glyphosate tolerance), high-yielding crops, seeds with desirable fatty-acid profiles (e.g., as in low-linoleic acid soybeans), high-oil seeds, insect tolerance (e.g., corn-bore resistance) and the like. When a potential specialty crop is developed (e.g., bred or genetically modified), it must be evaluated with respect to these desirable traits. Thus, the new crop must be replicated in a significant quantity, planted as individual plant specimens, subjected to a number of different stresses in groups, evaluated for growth parameters as individual plant specimens, and statistically analyzed in order to determine the effectiveness of the potential specialty crop with respect to the one or more desirable traits. Further, the plant specimens must be tracked so that the collected growth parameter data can be correlated to the stresses applied to each plant specimen.

Traditionally, researchers plant seeds in trays on various types of germination media by hand, subject the trays to predetermined stress conditions, remove the plant specimens from the trays by hand, evaluate growth parameters of each plant specimen by hand, and track the growth data. However, a growing number of potential specialty crops combined with a need to periodically evaluate specialty crops in production has given rise to a need to prepare, track, and evaluate more plant specimens than is practical by these traditional methods. Further, evaluating growth parameters of plant specimens by optical analysis reduces measurement variation.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure is directed to systems and methods for preparing plant specimens, tracking plant specimens, capturing images of plant specimens, and evaluating growth parameters of the plant specimens in the captured images. In one or more embodiments, the system prepares receptacles by placing a predetermined quantity of gel into a receptacle and a layer of cover material (e.g., an artificial material or an organic mixture of soil and water) on top of the gel. The system separates a quantity of seeds into individual seeds and places an individual seed in the receptacle between the gel layer and the cover layer or at a predetermined depth within the cover layer. The receptacles are then arrayed into decks and carts and subjected to controlled stresses such as cold temperatures followed by conditions conducive to germination and growth. The receptacles are then removed from the carts and decks, and an image capture device captures backlit images of the receptacles. A processor analyzes the captured images for plant morphology by determining growth parameters (e.g., shoot height, root depth, root mass, root volume, shoot mass, shoot volume, shoot width, germination potential, abnormalities, etc.) of the plant specimens, and enters those parameters into a database together with an identifier associated with each plant specimen. The database can then be analyzed according to any number of criteria.

In one embodiment, a system for preparing a plant specimen and measuring a growth parameter of the plant specimen includes a plurality of receptacles, a gel layer system, a cover layer system, a seed singulation system, a climate system, an imaging system, and a robotic subsystem. Each of the plurality of receptacles is substantially transparent. The gel layer system for receives the plurality of receptacles and places a substantially transparent gel in a bottom of each of the plurality of receptacles. The cover layer system places a cover layer adjacent (e.g., on top of) the gel layer in each of the plurality of receptacles. The seed singulation system receives the plurality of receptacles, separates a plurality of seeds into individual seeds, and places one seed in each of the plurality of receptacles, and the climate system subjects the plurality of receptacles to controlled climate conditions. The imaging system receives the plurality of receptacles from the climate system, captures an image of plant specimens developing from the plurality of seeds; and measures a growth parameter of at least one of the plant specimens. The robotic subsystem for transfers the plurality of receptacles from the gel system to the seed singulation system, from the seed singulation system to the cover layer system, from the cover layer system to the climate system, and from the climate system to the imaging system.

In another embodiment, a system for measuring a growth parameter of a plant specimen includes a light source, and imaging device, a space, and a processor. The imaging device captures an image of the plant specimen. The captured image is a profile of a substantially transparent receptacle receiving the plant specimen such that any shoot of the plant specimen extends generally upward in the captured image toward a top of the receptacle and any root of the plant specimen extends substantially downward in the captured image toward a bottom of the receptacle. The space is a space between the imaging device and the light source for receiving the receptacle and the plant specimen. The processor for analyzes the captured image for a growth parameter of the plant specimen.

In another embodiment, a growth parameter of a plant specimen is measured. The plant specimen is positioned between a light source and an imaging device, and an imaging device captures an image of the plant specimen. The image is a side profile of a substantially transparent receptacle receiving the plant specimen such that any shoot of the plant specimen extends substantially upward in the captured image toward a top of the receptacle and any root of the plant specimen extends substantially downward in the captured image toward a bottom of the receptacle. A processor then analyzes the captured image for a growth parameter of the plant specimen.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

FIG. 6 is a block diagram of a method for measuring a growth parameter of a plant specimen according to one embodiment.

Corresponding reference characters indicate corresponding parts throughout the drawings.

DETAILED DESCRIPTION

Figure 1:
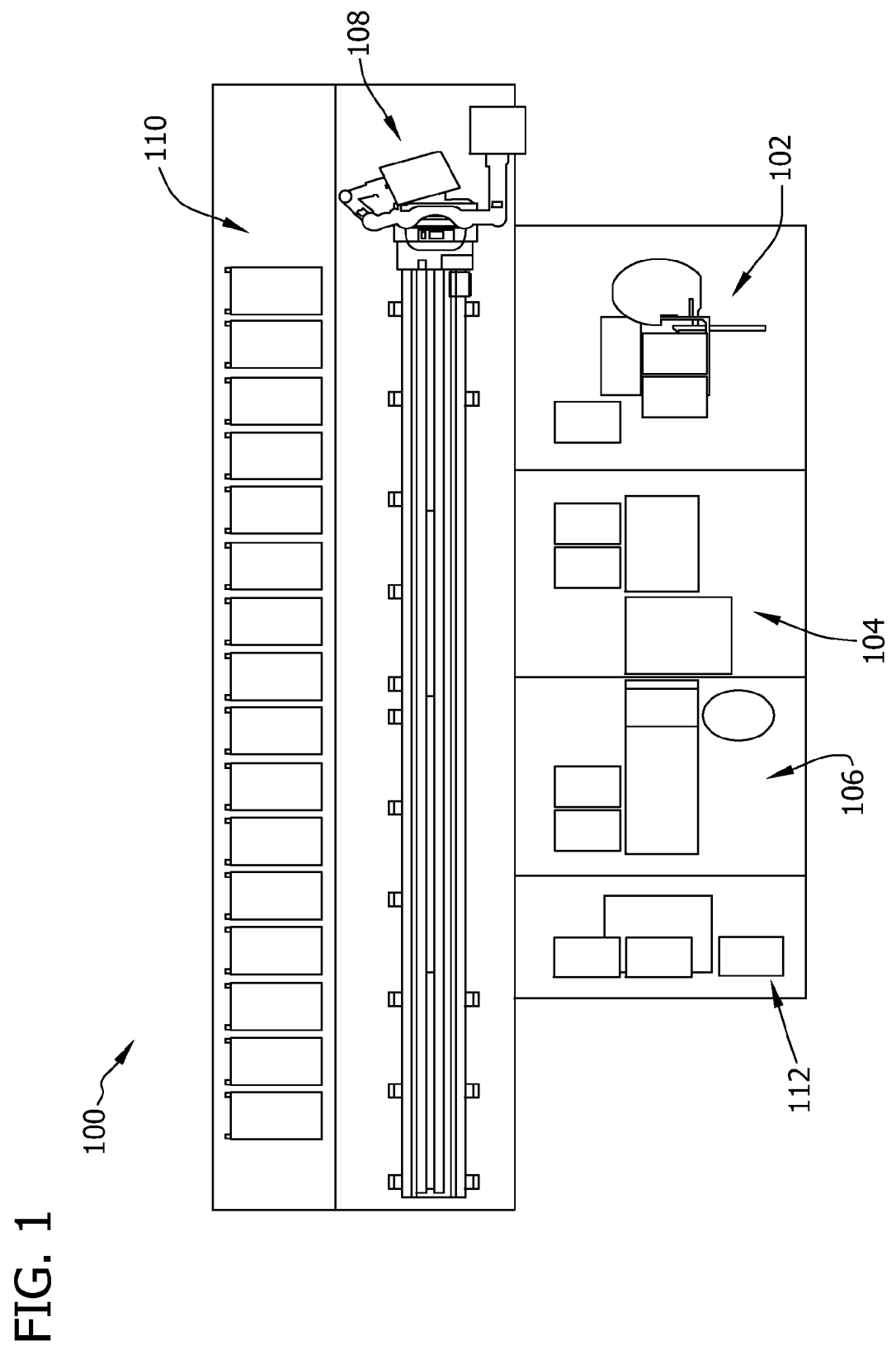
FIG. 1 is a diagram of a system for preparing a plant specimen and measuring a growth parameter of the plant specimen according to one embodiment.
Figure 2:
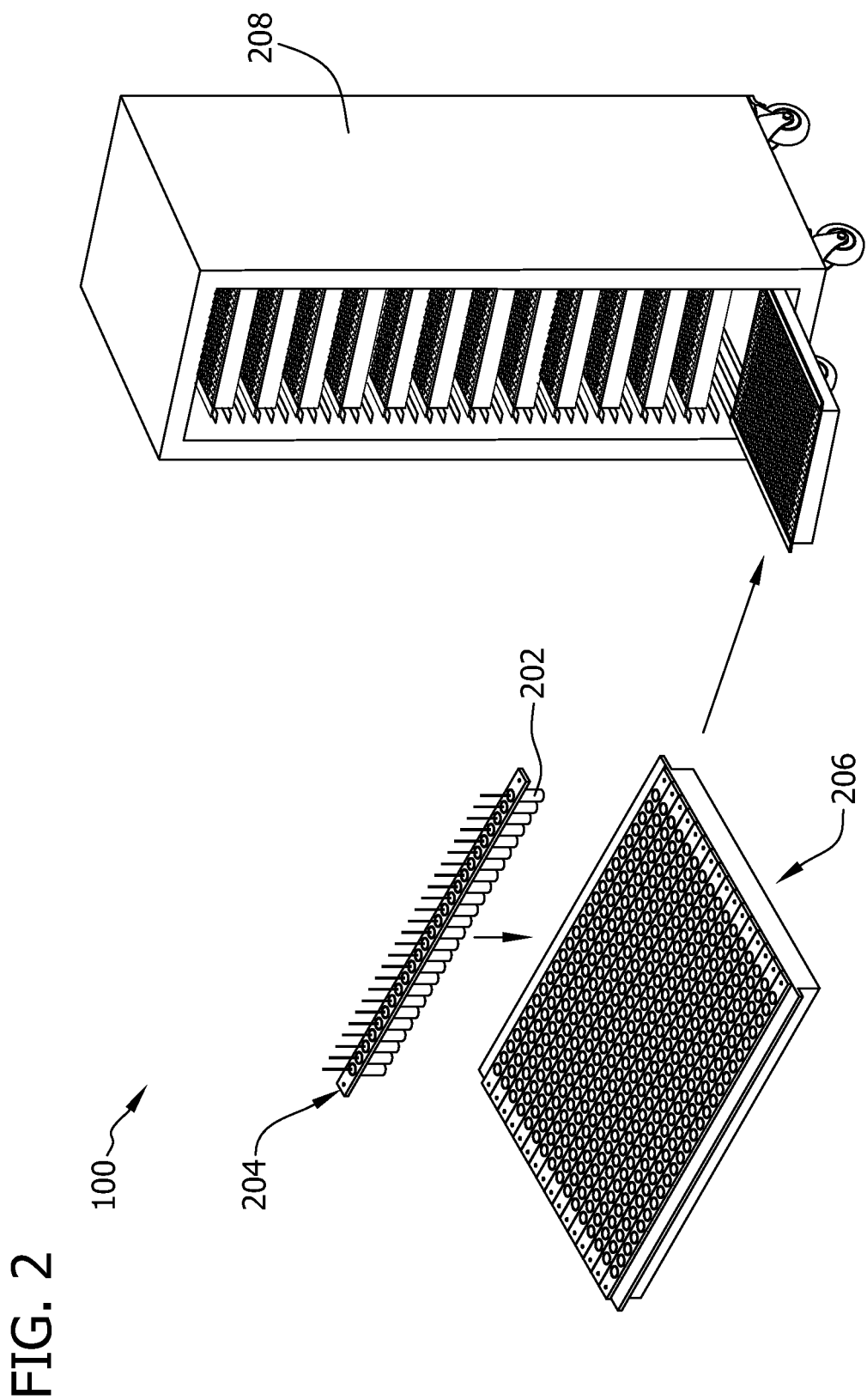
FIG. 2 is a diagram of rows, trays, and carts of receptacles according to one embodiment.

A germination testing system 100 of an embodiment of the present disclosure is generally shown in FIGS. 1 and 2. A gel layer system 102 applies a substantially transparent gel to a bottom of a tube or receptacle 202 (see FIG. 2). In one embodiment, the gel is a natural polymer. As further described below, a gel agent is applied to the receptacle 202 and allowed to gelate (set). A plurality of receptacles are arrayed into a rack 204, and a plurality of racks are arrayed into a deck 206. A plurality of decks are then arrayed into a cart 208. In other words, the rack 204 is a row of receptacles, and the deck 206 is a column of racks (i.e., the deck 206 is a grid of receptacles). The cart 208 includes a series of shelves or bays for receiving the decks. In one embodiment, cart 208 comprises 14 decks, deck 206 comprises 16 racks, and rack 204 comprises 25 receptacles. The receptacles may be integral with rack 204, or formed separately and inserted into rack 204.

Referring again to FIG. 1, seed singulation system 106 includes a hopper and a dispenser. A user places a plurality of seeds in the hopper, and the seed singulation system 106 places one seed in each receptacle 202 via the dispenser. In one embodiment, the seed singulation system 106 places the seed on top of the gel layer. Aspects of the seed singulation system 106 are further discussed in U.S. patent application Ser. No. 11/769,318 filed on Jun. 27, 2007, the entire disclosure of which is incorporated herein by reference.

An organic layer system 104 places a moist, porous material in the receptacle 202 on top of the gel and seed. In one embodiment, the material comprises soil and water. The material may also comprise ground corncobs, perlite, vermiculite, coal pearls, water storing gel beads, moss, clay-based soil conditioner such as Turface™, diatomite, pumice rock, or sand. The cover layer system 104 thus produces a plant specimen that is prepared for testing. In another embodiment, the cover layer is placed in the receptacle 202 before the seed, and the seed is placed at a specified depth within the cover layer. In another embodiment, no cover layer is applied, and the seed rests uncovered on top of the gel. In another embodiment, gel is not placed in the receptacle 202 such that the seed is placed under the cover layer, at some predetermined depth in the cover layer, or uncovered on top of the cover layer.

A robotic subsystem 108 moves deck 206 from the gel layer system 102 to the seed singulation system 106, and from the seed singulation system 106 to the cover layer system 104. The robotic subsystem 108 then places a plurality of decks containing prepared plant specimens in cart 208, and cart 208 is exposed to a climate system 110 which subjects the plant specimens in the cart 208 to controlled climate conditions. In one embodiment, the cart 208 is moved away from the system 100 and into a room to subject the plant specimens to a stress period. In another embodiment, the system 100 is in a controlled environment and it is not necessary to move the cart 208 away from the system 100.

During the stress period, the plant specimens in the cart 208 are exposed to controlled stress conditions such as low temperature, high humidity, different wavelengths and intensities of light, varying concentrations of certain pesticides, certain pests, and/or varying concentrations of certain herbicides. For example, the cart may be kept in a dark room at a predetermined temperature for a predetermined amount of time or exposed to a temperature profile over a given period of time while the humidity is similarly controlled. As used herein, profile is intended to mean a predetermined set of conditions that varies with time over a given period. For example, in one profile a temperature varies in a linear fashion from 30 degrees to 50 degrees and back to 30 degrees Fahrenheit every 24 hours. The stress period may include any combination of conditions applied to the plant specimens over any amount of time.

Following the stress period, the plant specimens in the cart 208 are exposed to a growth period. For the growth period, the cart 208 may remain in the same room where it was subjected to the controlled stress conditions during the stress period or be moved to another room. During the growth period, the plant specimens in the cart 208 are exposed to a temperature, humidity, and light profile over a period of time conducive to germination and growth of the plant specimens in the cart 208. One skilled in the art will recognize that the decks may be removed from the cart 208 in order to facilitate proper application of environmental conditions to the plant specimens (e.g., light). One skilled in the art will also recognize that any profile (i.e., sequence) of stress periods and growth periods may be applied to the plant specimens. For example, a set of plant specimens may be repeatedly cycled between a stress period and a growth period, and neither the stress periods nor the growth periods need be identical to one another. In another example, a set of plant specimens may be repeatedly cycled between a stress period and a growth period wherein the stress period and the growth period both apply optimal growth conditions (e.g., optimal temperature, humidity, and light conditions) to the set of plant specimens.

Figure 3:
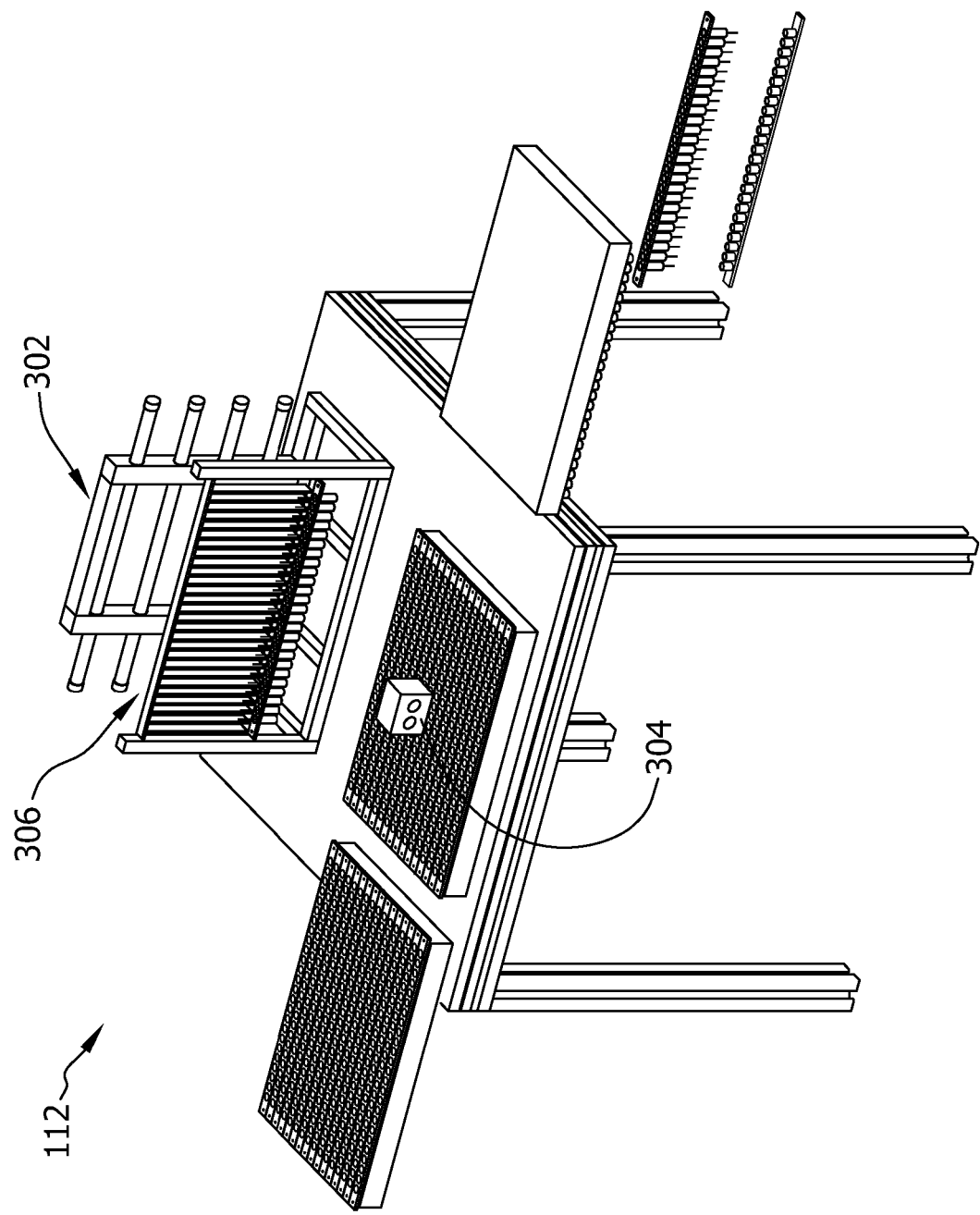
FIG. 3 is a diagram of an imaging system for measuring a growth parameter of a plant specimen according to one embodiment.
Figure 4:
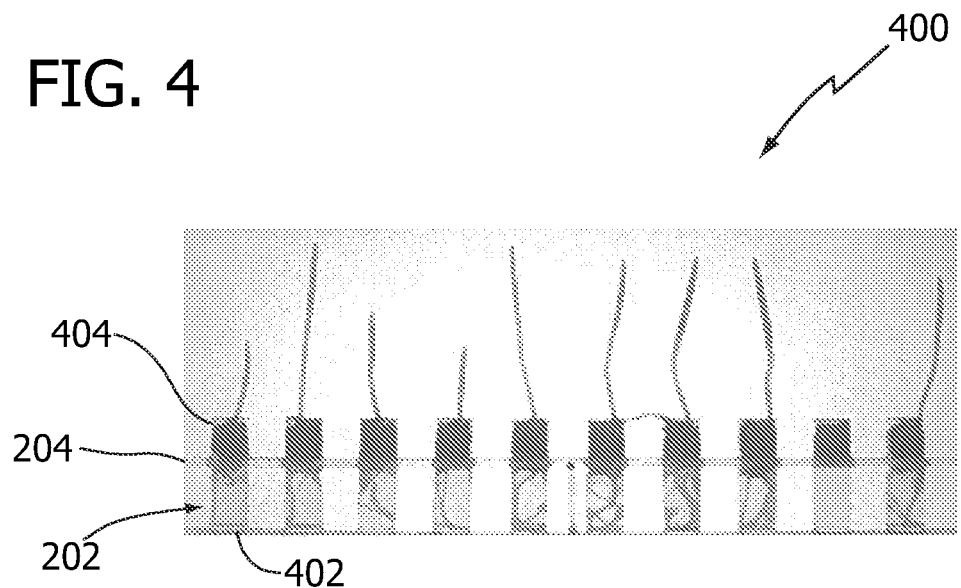
FIG. 4 is a captured profile image of a plant specimen for measuring according to one embodiment.

After the stress and growth periods, the cart 208 is returned to the system 100, and the robotic subsystem 108 transfers the deck 206 to imaging system 112. Referring to FIG. 3, the imaging system 112 comprises a backlight 302, an imaging device 304, and a space 306 between the backlight 302 and the imaging device 304 for receiving the rack 204. In one embodiment, the imaging device 304 is a digital camera. In one embodiment, the imaging device 304 also includes an X-ray scanner. The imaging system 112 or the robotic subsystem 108 removes the rack 204 from the deck 206 and positions the rack 204 in the space 306 such that the imaging device 304 captures a profile of the rack 204 as shown in FIG. 4 at 400. The imaging device 304 may capture an image of the entire rack 204 at once, or each individual receptacle 202. In one embodiment, the rack 204 includes a unique identifier (e.g., a bar code, a numerical identifier, or a Radio Frequency Identification tag).

Referring to FIG. 4, the captured image 400 comprises a plurality of horizontal lines (i.e., rows of pixels) and a plurality of vertical lines (i.e., columns of pixels). Each receptacle 202 has a bottom 402 and a top 404. Any root of the plant specimen extends toward the bottom 402 of the receptacle 202, and any shoot of the plant specimen extends toward the top 404 of the receptacle 202. The top 404 of receptacle 202 is open. However, in other embodiments, the receptacle may be taller having a closed or perforated top or capped with a sealed cap or perforated cap. The receptacle 202 comprises a vertical axis extending from the center of the bottom 402 through the center of the top 404. The vertical axis aligns with the vertical lines in the captured image 400 such that, for orientation for discussion purposes, any shoots of the plant specimen generally extend upward toward a top of the image 400, and any roots of the plant specimen generally extend downward toward a bottom of the image 400. In one embodiment, the bottom of the image 400 is aligned with the bottom of the receptacle 202. One skilled in the art will recognize that a higher throughput can be achieved by capturing an image of the entire rack 204 at once and later dividing the image into the individual receptacles and plant specimens. One skilled in the art will also recognize that the rack 204 could be returned to the deck 206 and cart 208 for further stress periods and/or growth periods in order to capture a series of time lapse images of the plant specimens in the rack 204. The time lapse images can be used to determine and chart a growth rate of a plant specimen. In one embodiment, the image 400 includes the unique identifier of the rack 204 (e.g., a barcode or numerical identifier is present on or affixed to an otherwise transparent are of the rack 204). In another embodiment, the imaging system 112 includes a Radio Frequency Identification (RFID) interrogator which reads an RFID from an RFID tag on the rack 204. In yet another embodiment, a substantially opaque unique identifier (e.g., a barcode or numerical identifier) is affixed to the rack 204 and read by a reader (e.g., a barcode scanner or digital camera). The reader may be separate from the imaging device 304, or the imaging device 304 may read the barcode or unique identifier when used with an appropriate front lighting system. The imaging system 112 thus captures the image 400 of the plant specimens and a unique identifier for each plant specimen in the rack (i.e., the unique identifier of the rack and the position of the receptacle of the plant specimen within the rack).

The system 100 further comprises a processor (not shown) for analyzing the captured image 400 to determine one or more growth parameters of the plant specimens and a database (not shown) for storing the determined growth parameters together with the unique identifier associated with each plant specimen, a description of traits of the plant specimen (i.e., which specialty crop variant the plant specimen is) and a description of the conditions that the plant specimen was subjected to during the stress and growth periods. In one embodiment, a time of the captured image 400 is also stored in order to properly sequence multiple images of a plant specimen to form a time lapse analysis of the plant specimen. In one embodiment, the time lapse analysis is used to determine a growth rate of the plant specimen. The processor analyzes the image 400 captured by the imaging device 304 by first eliminating any grayscale and color variances in the image 400. In one embodiment, the processor determines whether each pixel is darker or lighter than a threshold and changes that pixel to black if it is darker than the threshold and white if it is lighter than or equal to the threshold resulting in modified image 500 of FIG. 5. Any binary color scheme is operable for the image analysis purposes described herein; black and white is merely an exemplary color scheme. Further, it is not necessary to use any color scheme as the modified image 500 could be represented as a matrix of binary code. The processor also divides the modified image 500 into individual plant specimens as can be seen in the modified image 500 of FIG. 5.

In one embodiment, the processor further prepares the modified image 500 by changing any statistically insignificant black pixels to white pixels and any statistically insignificant white pixels to black. In other words, if a random pixel in the image is black, the image is changed to white and vice versa. For example, a dust spec may be on a lens of the imaging device 304 causing a few pixels near the top of the modified image 500 to be black. Those pixels would be changed to white prior to further analysis.

Figure 5:
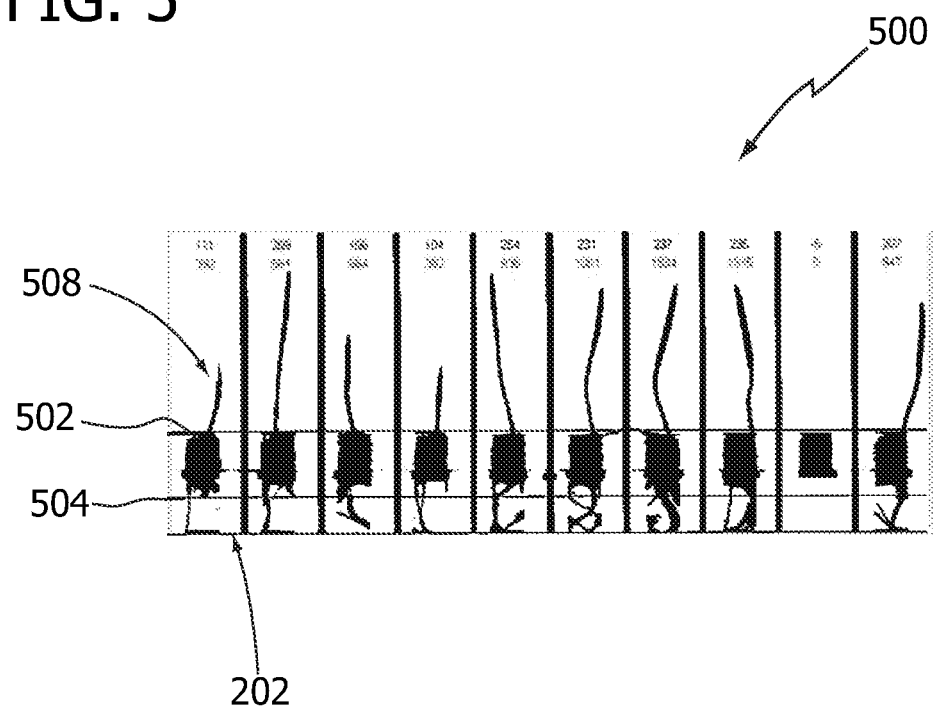
FIG. 5 is the captured profile image of FIG. 4 after an initial analysis step according to one embodiment.

Referring to FIG. 5, each receptacle 202 includes a plant specimen 508. A first transition line 504 exists at the boundary between the substantially transparent gel and the substantially opaque cover layer. A second transition line 502 exists at the boundary between the cover layer and air. Because the gel layer and cover layer are initially deposited in the receptacle 202 in known quantities, the first transition line 504 and the second transition line 502 may be predetermined by the processor at fixed horizontal lines of pixels in the modified image 500. Alternatively, the processor may individually determine the first transition line 504 and the second transition line 502 for each receptacle. In one embodiment, the first transition line 504 is determined by comparing the quantity of black pixels in each horizontal line of the image 500 to the quantity of black horizontal pixels in each adjacent horizontal line of the image 500. When moving up the image 500 from the bottom, the first horizontal line to have a majority of black pixels is determined to be the first transition line 504. Similarly, the second transition line 502 is determined by continuing the comparison of one horizontal line to the next horizontal line up the image 500 until the first line having a majority of white pixels is found and determined to be the second transition line 502. Further, the determined first transition line 504 and second transition line 502 may be verified against expected locations for the first and second transition lines to assure the accuracy of the determination. Various other mathematical analysis are contemplated within the scope of the application including methods of determining the first and second transition lines using standard deviation, averaging, and medians. A left side and a right side of each receptacle may be similarly predetermined or determined by comparing the number of black and white pixels in each vertical line working from one side of the image 500 to the other. In one embodiment, the left side and right side of each receptacle are the boundaries for dividing the image 500 between receptacles in the image 500, while in another embodiment a vertical line of pixels half way between the sides of two adjacent receptacles may be the boundary for dividing the image 500 between adjacent receptacles.

After the processor has prepared the image 500, the processor proceeds to determine any quantity of growth parameters for the plant specimen 508. Growth parameters are metrics indicative of any of germination, health, and vigor of the plant specimen 508. Exemplary growth parameters include a quantity of any shoots in the plant specimen; a quantity of any roots in the plant specimen; a total mass of any shoot in the plant specimen; a volume of any shoot in the plant specimen; a total mass of any roots in the plant specimen; a total volume of any roots in the plant specimen; a total mass of any roots and shoot in the plant specimen; a total volume of any roots and shoot in the plant specimen; a mass of a shoot in the plant specimen; a volume of a shoot in the plant specimen; determining a mass of a largest root in the plant specimen; determining a volume of a largest root in the plant specimen; a height of a shoot in the plant specimen; and a depth of a deepest root in the plant specimen. One skilled in the art will recognize that making an exact measurement of the mass or volume of the roots or shoot of a plant specimen requires removing the plant specimen from the receptacle 202, separating the relevant portion of the plant specimen from the rest of the plant specimen, and placing the relevant portion of the plant specimen on a scale (or in a known volume of liquid and measuring displacement). As further described herein, mass or volume may be estimated from other metrics. Additional growth parameters indicative of plant structure abnormalities such as shoot morphology include determining the presence of a curled shoot and/or split shoot, and determining whether a plant specimen germinated (i.e., germination potential).

To determine the height of a shoot of the plant specimen 508, the processor sets an upper bound at the horizontal line farthest up the modified image 500 having a black pixel. The processor also sets a lower bound at the determined second transition line 502. The processor then determines a difference between the upper bound and the lower bound. In one embodiment, each horizontal line of the image 500 corresponds to a known distance, and the processor determines an actual height of the shoot of the plant specimen 508 by multiplying the difference between the upper bound and the lower bound by the known distance. In another embodiment, the processor determines the height in lines of pixels without converting to actual height. The depth of any root is similarly calculated by comparing the first transition line 504 to the lowest horizontal line having a black pixel.

To determine the mass or volume of any roots in plant specimen 508, the processor sets an upper bound at the first transition line 504 and a lower bound parallel to the upper bound at a first predetermined distance from the lower bound. In one embodiment, the lower bound is set at the bottom of the image 500 which coincides with the bottom of the receptacle 202. The processor also sets a left bound and sets a right bound a second predetermined distance from the left bound. In one embodiment, the left and right bounds coincide with the sides of receptacle 202 in the modified image 500. The processor then determines a quantity of black pixels in a portion of the image bound by the lower bound, the upper bound, the left bound, and the right bound and estimates a mass or volume of the roots as a function of the determined quantity. In one embodiment, each pixel in the image 500 correlates to a known distance, and an actual cross sectional area of any roots is calculated. The mass or volume of a shoot is similarly calculated by setting the lower bound at the second transition line 502 and the upper bound at an upper edge of the image and determining a quantity of black pixels in the bounded area of the image 500.

To determine plant morphology, such as abnormalities including a split shoot or a curled shoot, the processor sets a lower bound at the determined second transition line 502 and an upper bound an arbitrary distance above the lower bound. The processor then analyzes each horizontal line of the captured image between the upper and lower bounds for white pixels between black pixels. If a white pixel is detected between the black pixels, an abnormality is determined. The system may then perform further image analysis to identify the particular abnormality, the system may identify the plant specimen to a user of the system for further manual inspection, or the system may take no additional action.

In one embodiment, additional images of the plant specimens are captured in order to facilitate a more detailed analysis. The multiple images are reconstructed into a 3 dimensional model of each plant specimen by the processor. In one embodiment, images are captured with the rack 204 positioned perpendicular to the direction of the imaging device 304 for a first image, and the rack 204 is rotated 45 degrees around a vertical axis from perpendicular to the imaging device 304 in both a clockwise and counterclockwise direction to capture second and third images. One skilled in the art will recognize that the processor may analyze each of the captured first, second, and third images individually and compare the determined growth parameters, or reconstruct the captured first, second, and third images into a 3 dimensional model of the plant specimen and analyze the 3 dimensional model for growth parameters. One skilled in the art will also recognize that the rack 204 may be rotated about a vertical axis from perpendicular to the view of the imaging device at other than 45 degrees, such as 30 degrees. In another embodiment, each receptacle 202 is removed from the rack 204 and rotated 90 degrees for at least one of said additional images.

In various embodiments, the processor provides different types of data to the database. For example, in one embodiment, the modified image 500 is entered into the database while in other embodiments, the captured image 400 is entered into the database, or no image is entered into the database. The growth parameters determined by the processor are entered into the database together with an identifier corresponding to the plant specimen from which the growth parameters were determined and a description of any stress periods and growth periods applied to the plant specimen. In one embodiment, the description is a computer readable file (e.g., an XML file) comprising instructions for the climate system 110 for applying a stress profile and a growth profile to a plant specimen.

Referring to FIG. 6 in one embodiment, a method 600 of measuring a growth parameter of a plant specimen includes preparing a plant specimen at 602, subjecting the plant specimen to controlled conditions at 626, capturing an image at 604, and analyzing the captured image at 606. Preparing the plant specimen at 602 includes applying a known quantity of gel agent to a receptacle at 608 and allowing the gelling agent to gelate. At 610, a seed is placed on top of the gel layer, and a cover layer is placed on top of the seed at 612. In one embodiment, the cover layer comprises soil and water.

At 626, the prepared plant specimen is subjected to a set of controlled climate conditions. For example, the plant specimen may be placed in a relatively cold and dark environment for 72 hours during a stress period at 628. Then, the plant specimen is subjected to climate conditions conducive to germination and growth at 630. These cycles may be repeated in any combination before and after proceeding to capture an image of the plant specimen at 604.

At 604, an imaging device captures an image of the plant specimen. In one embodiment, the plant specimen is again subjected to stress periods and/or growth periods and additional images are captured to develop a time lapse of plant specimens subjected to various conditions though their growth. Capturing an image of the plant specimen at 604 includes positioning the plant specimen between the imaging device and a backlight at 614 and capturing an image of the plant specimen at 618.

The captured image is analyzed or processed by a processor at 606. The processor initially processes the captured image at 620 by converting each pixel in the captured image to either black or white as a function of the darkness of each pixel. For example, if the pixel is darker than a predetermined threshold, then the pixel is changed to black, and if the pixel is lighter than or equal to the predetermined threshold, the pixel is changed to white. Further, the first transition line between the gel layer and the cover layer and the second transition line between the cover layer and air adjacent the cover layer is determined. In one embodiment, the first and second transition lines are predetermined at fixed horizontal lines in the image. Additionally, statistically insignificant black pixels and statistically insignificant white pixels are disregarded. For example, a single black pixel near the top of the image is converted to white whereas a black pixel adjacent a string of black pixels tracing to the second transition line is not converted to a white pixel. At 622, the processed image is analyzed for growth parameters of the plant specimen, and at 624, data indicative of the growth parameters is stored in a database together with a unique identifier corresponding to the plant specimen and a description of the stress conditions and growth conditions applied to the plant specimen. Optionally, the database may include the captured or processed images. Further analysis may be conducted, such as finding the average and standard deviation of the determined parameters for plant specimens having the same traits and being subjected to the same controlled conditions during the stress and growth periods at 632.

Note that after data capture from a plant specimen is complete, the receptacles 202 may be cleaned, such as by water jets, inspected, and if suitable, thereafter re-used.

This written description uses examples to disclose the invention, including the best mode, and also to enable any person skilled in the art to practice the invention, including making and using any devices or systems and performing any related methods. The patentable scope of the invention may include other examples that occur to those skilled in the art. Such other examples are intended to be within the scope of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of the present invention or the embodiments thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description and shown in the accompanying drawings shall be interpreted as illustrative and not in a limiting sense.

What is claimed is:

1. A system for measuring a growth parameter of a plant specimen, said system comprising:
   a light source;
   an imaging device for capturing an image of the plant specimen, wherein said image is a profile of a transparent receptacle receiving the plant specimen, and wherein the receptacle comprises:
      a transparent layer at the bottom of the receptacle,
      a cover layer adjacent the transparent layer, such that there is a first transition line between the transparent layer and the cover layer, and a second transition line between the cover layer and air above the cover layer, and wherein a vertical axis of the receptacle extends through a center of the top of the receptacle and through a center of the bottom of the receptacle, wherein the captured image comprises vertical lines of pixels aligned with the vertical axis of the receptacle and horizontal lines of pixels perpendicular to the vertical axis of the receptacle in the captured image, and said first and second transition lines are horizontal lines of the captured image;
   a space between the imaging device and the light source for receiving the receptacle and the plant specimen; and
   a processor for analyzing the captured image to determine a growth parameter of the plant specimen relative to bounds set in the captured image.

2. The system of claim 1 wherein the transparent layer comprises a transparent gel and the cover layer comprises a opaque mixture comprising soil and water, and wherein analyzing the captured image comprises changing each pixel that is not either black or white to either black or white as a function of an initial value of the pixel and disregarding statistically irrelevant pixels within the image.

3. The system of claim 1 wherein the growth parameter is a height of a shoot of the seedling, and wherein analyzing the captured image comprises:
   setting a lower bound at the second transition line;
   setting an upper bound parallel to the lower bound at a black pixel farthest from the second transition line; and
   determining a distance between the upper bound and the lower bound, said distance being the height of the shoot.

4. The system of claim 1 wherein the growth parameter is a depth of a root of the seedling, and wherein analyzing the captured image comprises:
   setting an upper bound at the first transition line;
   setting a lower bound parallel to the upper bound at a black pixel farthest from the first transition line; and
   determining a distance between the upper bound and the lower bound, said distance being the depth of the root.

5. The system of claim 1 wherein the growth parameter is a mass of any shoots of the seedling, and wherein analyzing the captured image comprises:
  setting a lower bound at the second transition line;
  setting an upper bound parallel to the lower bound at a first predetermined distance from the lower bound;
  setting a left bound;
  setting a right bound a second predetermined distance from the left bound;
  determining a quantity of black pixels in a portion of the image bound by the lower bound, the upper bound, the left bound, and the right bound; and
  estimating a mass of the shoots as a function of the determined quantity.

6. The system of claim 5 wherein the left bound is coincidental with a left side of the receptacle, and the right bound is coincidental with a right side of the receptacle.

7. The system of claim 1 wherein the growth parameter is a mass of any roots of the seedling, and wherein analyzing the captured image comprises:
  setting an upper bound at the first transition line;
  setting a lower bound parallel to the upper bound at a first predetermined distance from the lower bound;
  setting a left bound;
  setting a right bound a second predetermined distance from the left bound;
  determining a quantity of black pixels in a portion of the image bound by the lower bound, the upper bound, the left bound, and the right bound; and
  estimating a mass of the roots as a function of the determined quantity.

8. The system of claim 1 wherein the first and second transition lines are determined by determining a difference between a ratio of black pixels to white pixels in adjacent horizontal lines of the captured image and determining that the two largest differences in the ratio between two adjacent horizontal lines are each at a transition line when a plurality of horizontal lines between the transition lines consist essentially of black pixels.

9. A method for measuring a growth parameter of a plant specimen, said method comprising:
  positioning the plant specimen between a light source and an imaging device;
  capturing an image of the plant specimen via the imaging device, wherein said image is a side profile of a transparent receptacle receiving the plant specimen such that any shoot of the plant specimen extends upward in the captured image toward a top of the receptacle and any root of the plant specimen extends downward in the captured image toward a bottom of the receptacle, and wherein the receptacle comprises:
    a transparent layer at the bottom of the receptacle,
    a cover layer adjacent the transparent layer, such that there is a first transition line between the transparent layer and the cover layer, and a second transition line between the cover layer and air above the cover layer, and wherein a vertical axis of the receptacle extends through a center of the top of the receptacle and through a center of the bottom of the receptacle, wherein the captured image comprises vertical lines of pixels aligned with the vertical axis of the receptacle and horizontal lines of pixels perpendicular to the vertical axis of the receptacle in the captured image, and said first and second transition lines are horizontal lines of the captured image; and
  analyzing, via a processor, the captured image to determine a growth parameter of the plant specimen relative to bounds set in the captured image.

10. The method of claim 9 wherein the transparent layer comprises a transparent gel and the cover layer comprises a opaque mixture comprising soil and water, and wherein analyzing the captured image comprises changing each pixel that is not either black or white to either black or white as a function of an initial value of the pixel and disregarding statistically irrelevant pixels within the image.

\* \* \* \* \*